(12) United States Patent
Varkovitzky

(10) Patent No.: US 8,491,214 B2
(45) Date of Patent: Jul. 23, 2013

(54) REUSABLE APPLICATOR TIP

(75) Inventor: Abraham Varkovitzky, Bloomfield Township, MI (US)

(73) Assignee: Econobuild.com LLC, Southfield, MI (US)

(*) Notice: Subject to any disclaimer, the term of this patent is extended or adjusted under 35 U.S.C. 154(b) by 333 days.

(21) Appl. No.: 12/930,600

(22) Filed: Jan. 12, 2011

(65) Prior Publication Data

US 2012/0177433 A1    Jul. 12, 2012

(51) Int. Cl.
*B43K 8/12* (2006.01)
(52) U.S. Cl.
USPC ............................ 401/207; 401/196; 401/183
(58) Field of Classification Search
USPC ................. 401/207, 196, 200–206, 183–185, 401/152–156, 187–188 R, 262, 269
See application file for complete search history.

(56) References Cited

U.S. PATENT DOCUMENTS

| | | | | |
|---|---|---|---|---|
| 4,748,990 A * | 6/1988 | Brown et al. | ................. | 132/320 |
| 5,018,894 A * | 5/1991 | Goncalves | .................... | 401/202 |
| 6,755,585 B2 * | 6/2004 | Gueret | .......................... | 401/125 |
| 7,101,105 B2 * | 9/2006 | Reggiani | ...................... | 401/205 |
| 7,114,871 B2 * | 10/2006 | Thiebaut | ...................... | 401/205 |
| 7,125,189 B2 * | 10/2006 | Gueret | .......................... | 401/202 |
| 7,156,572 B2 * | 1/2007 | Gueret | .......................... | 401/130 |
| 7,841,797 B2 * | 11/2010 | Delage | .......................... | 401/216 |

\* cited by examiner

*Primary Examiner* — David Walczak
*Assistant Examiner* — Jennifer C Chiang
(74) *Attorney, Agent, or Firm* — Arnold S. Weintraub; Bernard J. Cantor

(57) ABSTRACT

An applicator tip formed of a cup-shaped, internally threaded, cap is attached to the threaded neck of a bottle containing a liquid. A tubular spout extending from a hole in the base of the cap into the neck passes liquid through the hole into a porous pad on the base for application to a surface. A continuous, flange, surrounds the spout and is spaced uniformly inwardly of the cap threads to provide an inverted wedge-shaped annular space between the flange and the cap threads. The flange resiliently presses radially outwardly, and the cap threads press radially inwardly against the bottle neck to seal against liquid escaping over the rim of the neck.

5 Claims, 3 Drawing Sheets

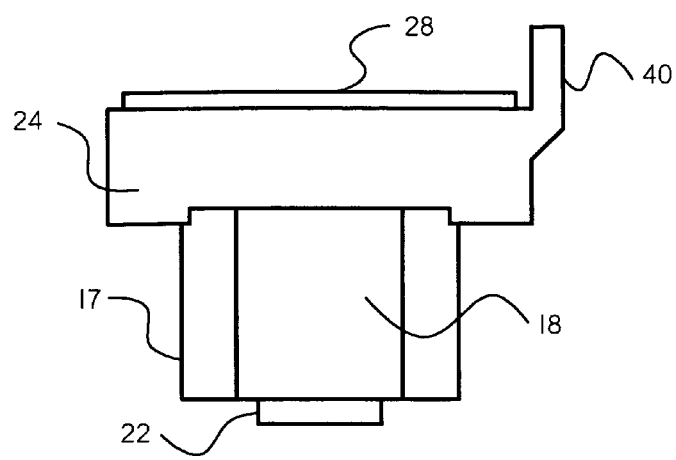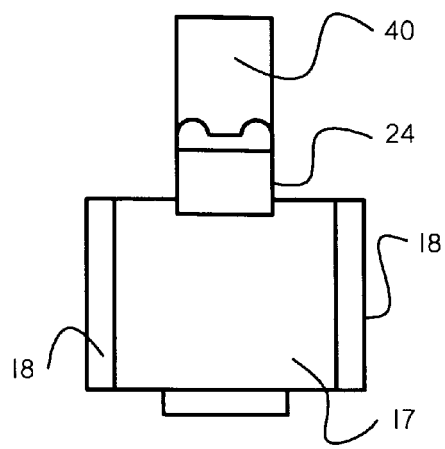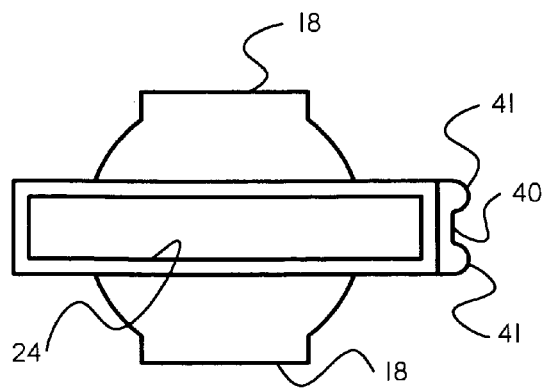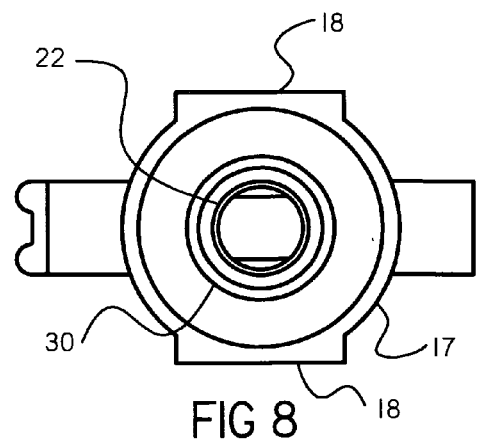

REUSABLE APPLICATOR TIP

FIELD

The invention relates to a reusable, leak-proof applicator tip for applying a uniform band of a liquid adhesive along the edge of a panel. The adhesive material, contained in a bottle or similar container, flows through the tip which is mounted upon the threaded end of the bottle.

BACKGROUND OF INVENTION

This section provides background information related to the present disclosure which is not necessarily prior art.

In mounting a panel of glass within a frame to form a glazed assembly, such as installing a sunroof or windshield or rear back-light panel, it is common to apply a narrow band of an adhesive material upon the upper and lower surfaces of the glass along the edges of the panel. In a typical installation, such as in a repair shop, the liquid adhesive may be provided in bottles or similar containers having threaded necks. An applicator tip, formed like a threaded bottle cap, in a cup-like shape, is threadedly engaged upon the threaded neck of the bottle. The applicator tip conventionally has a central hole over which a porous pad is secured. Thus, the liquid adhesive may flow through a central hole in the cap and through the pad which disburses the adhesive in a band along an edge of the panel during movement of the applicator along the panel edge.

Initially, the bottle, normally filled with the adhesive in liquid form, may be sealed with a typical bottle cap. For use, the cap is removed and the applicator tip replaces it and functions to spread the liquid, through the pad upon the panel. When the liquid supplied in the bottle is consumed, the tip may be removed by unthreading it from the bottle neck and reused over and over again.

An example of such an applicator tip is shown in the prior art U.S. Pat. No. D468,633, issued Jan. 14, 2003 to Kenneth Alan DeWood, entitled Applicator for Applying Material to a Surface.

Another prior art form of an applicator tip is described in U.S. Pat. No. 5,743,959, issued Apr. 28, 1998 to Charles E. Ash et al. entitled Reusable Applicator Tip. Such an applicator tip is also disclosed in U.S. Pat. No. 5,131,349, issued Jul. 21, 1992 issued to Thomas A. Keller et al. for an "Application of Primer Coating."

During the operation of applying an adhesive band upon a panel of glass, the removal and replacement of the applicator tip from one bottle to another, as bottles of adhesive are consumed, must be done rapidly and easily to be effective. Thus, it is desirable to insure that the inter-engaged threads on the internal wall of the cap-like applicator tip and the external threads on the bottle neck, not be adhered together by adhesive material leaking between them. Hence, it is desirable to have an applicator tip which may be quickly manually threadedly engaged upon, and easily removed from, the bottle neck. This is most effective when leakage between the two threads is avoided completely. Hence, the invention herein is concerned with forming an applicator tip in such a way as to seal the threads against receiving leaked liquid material between them during the time that the applicator tip is in use.

SUMMARY OF INVENTION

This section provides a general summary of the disclosure, and is not a comprehensive disclosure of its full scope or all of its features.

The invention herein contemplates modifying the threaded bottle-type cap applicator tip by forming a relatively resilient, integral, sealing flange within the cap. The flange is in the form of an annular- or ring-shaped projection, integral with the inner surface of the cap, extending downwardly adjacent to, but spaced a distance from the threads formed within the cap wall. The flange is wedge-shaped in cross-section. The wedge shape is accomplished by sloping or angling the wall of the flange which faces the threaded surface of the cap so as to provide an annular space between the flange and the threaded wall of the cap. The space is formed in an inverted wedge shape cross-section.

When the applicator tip is threadedly applied upon the threaded neck of the bottle or similar container, the rim portion of the bottle enters into the wide mouth of the converging space between the flange and the threaded wall of the cap. Hence, although there may be some slight variances in the thickness of the wall of the bottle neck or in the accuracy of the dimensions of the cap that may have occurred in the normal manufacturing processes, the neck is tightly jammed into the converging annular space. Hence, the interior edge of the rim of the bottle is sealed against the resilient flange which presses against it to preclude leakage from the liquid into the annular space. Similarly, the converging wall of the annular space and the pressure of the flange tend to jam the cooperating threads of the bottle neck and the cap. Consequently, a double, pressure or frictional seal is provided between the neck of the bottle and the cap-like tip. The result is that liquid adhesive is precluded from flowing or leaking between the engaged threads. That enables the removal of the cap quickly and easily as compared to what would otherwise occur if some adhesive material enters between the threads and begins to solidify and locks them together.

Thus, it is an object of this invention to provide a simple leak-proof engagement for mounting the tip of the applicator upon the supply container together so that the cap-like tip may be easily threaded on, or removed from, a bottle whose contents had been consumed and may be reapplied for reuse upon the next bottle without difficulty. The thread formed in the tip is kept clean and consequently is easily applicable to the neck of a bottle.

A further object of this invention is to provide an inexpensive, simply constructed, molded plastic cap-like applicator tip which may be reused numerous times for replacement upon supply bottles and to enable the application of predetermined width bands of adhesive along the peripheral edges of a panel, such as a large glass panel such as may be used in an automobile or in a window construction.

Further objects and advantages of this invention will become apparent upon reading the following description, of which the attached drawings form a part.

DRAWINGS

The drawings described herein are for illustrative purposes only of selected embodiments and not all possible implementations, and are not intended to limit the scope of the present disclosure.

Figure 3:
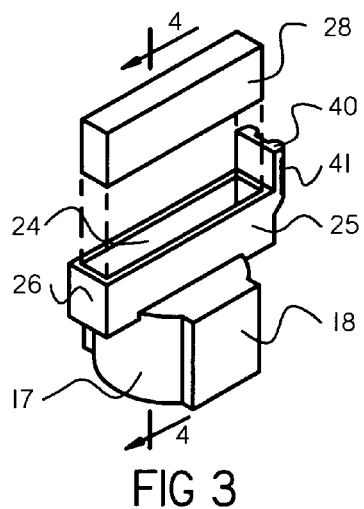

FIG. 3 illustrated, in perspective view, an applicator tip with its porous pad removed.

Figure 4:
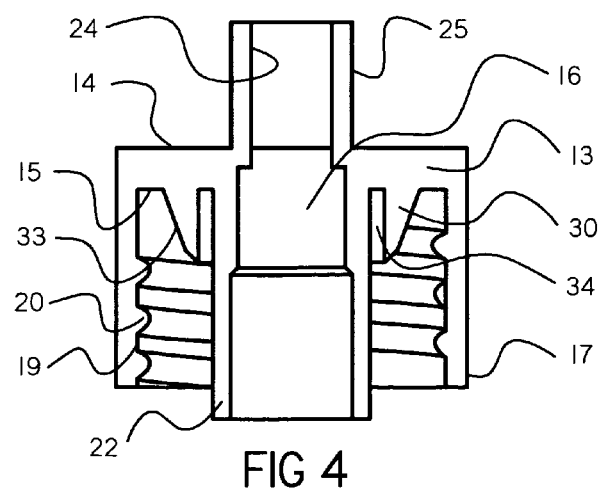

FIG. 4 is an enlarged, cross-sectional view, of the applicator tip taken in the direction of arrows 4-4 of FIG. 3.

FIG. 5 is a side elevational view of the applicator tip.

FIG. 6 is an end view of the applicator tip taken in the direction of arrows 6-6 of FIG. 5.

FIG. 7 is a top, plan view of the applicator tip.

FIG. 8 is a bottom view taken in the direction of arrows 8-8 of FIG. 5.

Figure 9:
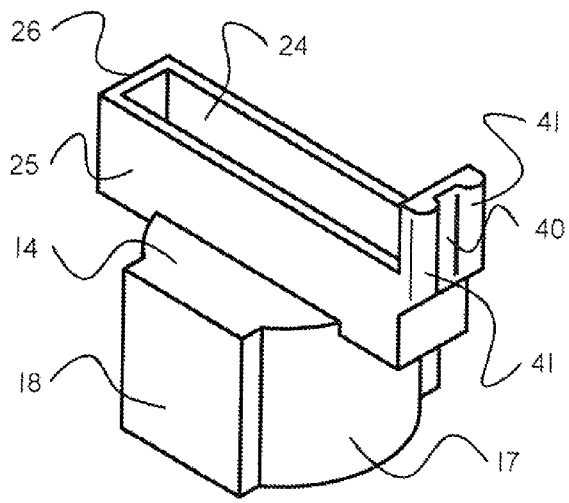

FIG. 9 is a perspective view of the applicator tip illustrating the guide element edge beads.

Figure 10:
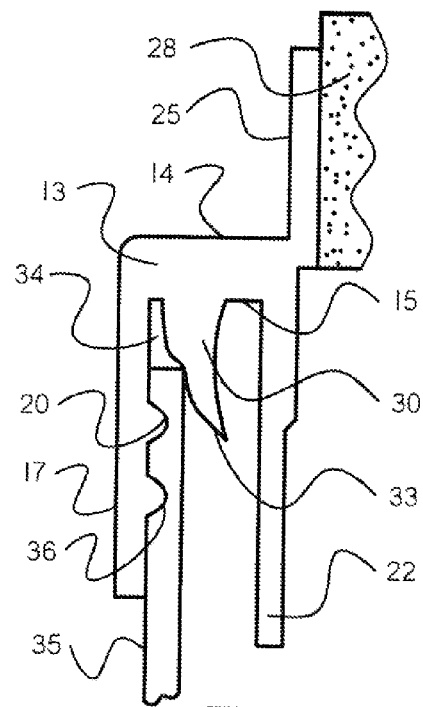

FIG. 10 is an enlarged, fragmentary, cross-sectional view of the applicator tip and rip of the bottle, illustrating the tapered sealing flange within the cap and rim arranged within the inverted wedge-shaped space between the flange and the threaded interior wall of the cap.

Figure 11:
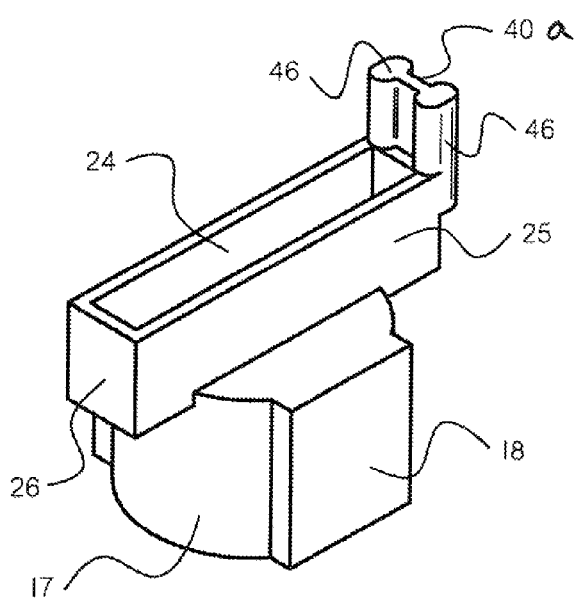

FIG. 11 is a perspective view of a modification illustrating a modified guide element on the tip.

Figure 12:
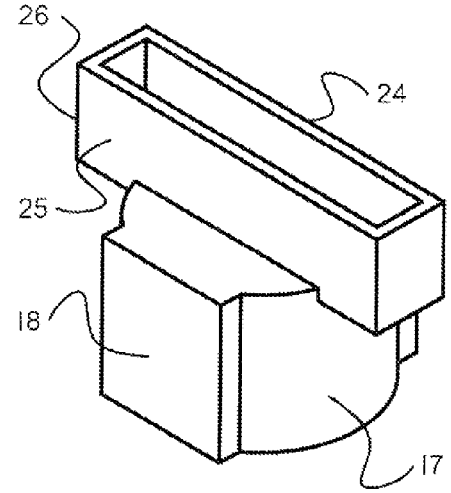

FIG. 12 is a second modification, in perspective, illustrating the applicator tip without a guide element.

Corresponding reference numerals indicate corresponding parts throughout the several views of the drawings.

DETAILED DESCRIPTION

Preferred embodiments will now be described more fully with reference to the accompanying drawings.

Figure 1:
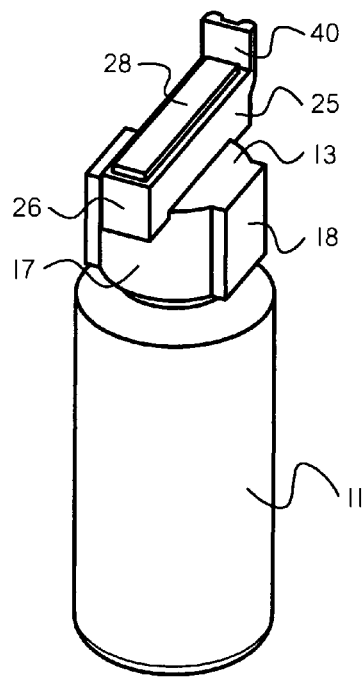
FIG. 1 illustrates in a perspective view an applicator tip assembled upon a conventional bottle.

FIG. 1 shows an applicator tip or cap applied upon a conventional bottle or container 11. The applicator tip is formed in the shape of a cup or cover having a base 13. The base has an upper surface 14 and an inner or lower surface 15 (see FIG. 4). A central opening 16 is formed through the base.

A circumferentially-arranged wall 17 forms the cup-shape with the base. A pair of flat areas 18 are formed on diametrically opposite sides of the outer surface of the wall. The inner surface 19 of the wall is formed with conventional screw-type threads 20. These threads are formed in a conventional size and shape for threadedly engaging with corresponding threads formed on the neck of the bottle.

An integral, tubular, spout 22 opens into the base opening 16 for flowing liquid through the base.

A channel or socket 24 is formed integrally with the upper surface of the base. The channel 24 is defined by parallel sidewalls 25 and end walls 26 which together provide an open-top socket. Positioned within the socket is a porous pad 28 which may, for example, be formed of non-woven fibrous or felt-like material of a type which will pass liquid contents entering the tip through the central hole in the base. Thus, the pad overlaps the hole and is supplied with the liquid from the container.

A ring-shaped sealing flange 30, formed integral with the lower surface of the base, surrounds the spout and is parallel to the circular inner-wall surface of the cup-shaped tip.

The sealing flange 30 has an outer surface 33 which is angled relative to the axis of the cap. This forms an annular space 34 between the flange and the threads formed on the interior wall surface of the cap. The neck portion 35 of the bottle or container 11 fits into the annular space 34 between the flange and the thread of the cap. Thus, the thread 36, formed on the neck, and the thread 20 of the cap inter-engage as the neck is moved into the tapered or wedge-shaped annular space 34. Thus, as the neck is threadedly engaged with the threaded cap, and the neck rim portion moves more deeply into the annular space 34, there is a radially outward force applied by the flange 30 and an opposing force between the threads, that is, the portion of the threads that are engaged tightly.

Preferably, the cap is formed by molding a suitable plastic material which has some flexibility or resiliency. Thus, the movement of the neck of the bottle into the space pushes radially inwardly against the flange to force some resilient movement of the flange which, in reaction, applies a radially outward sealing contact against the interior surface of the rim of the neck. FIG. 10 schematically illustrates the sealing contact between the rim and flange.

With the resilient force applied by the flange against the interior edge of the rim of the bottle neck, there is a tight engagement between the contacting portions of the threads. Thus, there is a double seal which prevents leakage of fluid from the bottle neck into the area of the cap threads. This keeps the threaded portions of the cap and the bottle free of any accumulation of adhesive which, when solidifying, would make it difficult to remove the applicator tip or reuse the tip on another bottle.

In operation, the bottle or container would be filled with a liquid material, such as a suitable adhesive, which is to be applied along the edge of a panel, such as a large glass panel. To help apply a predetermined width band of adhesive, a guide plate 40 is formed on one end of the channel, that is, upon an end wall 26, of the channel 24. To insure that the guide plate remains rigid and does not bend when it slides along a panel edge, the vertical side edges of the plate are formed with integral rigid ribs 41.

Figure 2:
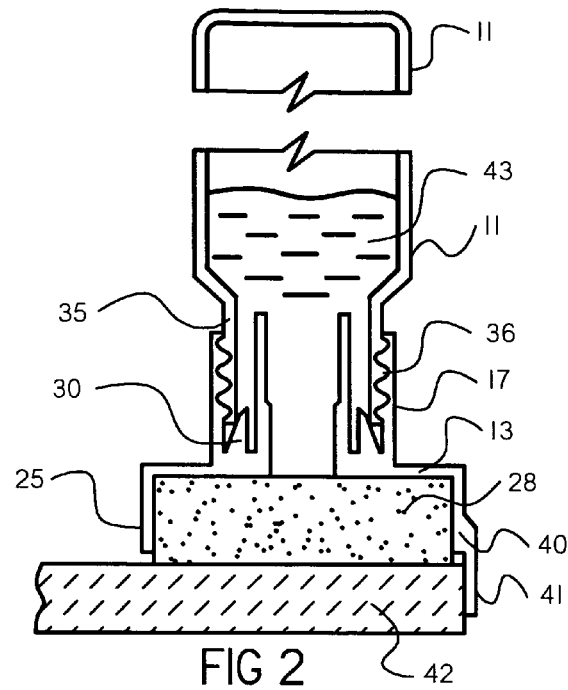
FIG. 2 is a schematic, cross-sectional view of the assembled applicator positioned upon the edge of a glass panel.

In operation, as shown in FIG. 2, where it is desired to form a band of adhesive on the upper surface, along the edge, of a glass panel 42, the user positions the guide plate 40 along the edge of the panel and slides the applicator along the edge so that the pad, which would contain the liquid flowing from the bottle, upon the glass surface. The liquid material, generally indicated by the numeral 43, would be selected from a suitable adhesive which initially is liquid and thereafter sets into a more solid form. Other liquid materials may be used in this type of device for applying a band of such materials along the edge portion of a panel.

FIG. 11 illustrates a modified applicator tip where the edge ribs 46 on the guide plate 40a, extend from both opposite faces of the plate. This rigidifies the plate against bending or twisting and also, provides a slideable contact between the inner portions of the ribs and the edge of the panel. This enables the user to accurately hold and slide the applicator tip along the panel.

Another modification illustrated in FIG. 12, shows the applicator tip 10b without any edge guide plate. This may be used in applications where the guide feature is not needed. Otherwise the constructions of the modifications in both FIGS. 11 and 12 are the some. Also, the length of the channel formed on the upper surface of the base of the cap, may be changed so that the channel extends longer or shorter relative to the cap depending upon the particular width of band desired when the applicator is in use in a production facility.

This invention may be further developed within the scope of the following claims. Accordingly, the foregoing description should be read as being merely descriptive of an operative, preferred modification of this invention and not in a strictly limiting sense.

What is claimed is:

1. A leak-proof, removable and replaceable applicator tip for a container having a tubular shaped, threaded neck having a rim through which liquid material from the container may flow, with said tip having a cup-shaped applicator cap having a base for covering a neck opening and an internally threaded circular wall for threadedly attaching the cap upon the container neck, and an opening in the cap base covered by a porous pad through which liquid from the container may flow and be applied upon a planar surface, the improvement comprising:

a narrow flange formed as a ring within the cap, integral with the cap base, and spaced inwardly of the cap threaded wall to form an annular space between the threaded cap wall and the flange;

said flange having an inner wall surface and an outer wall surface with the outer wall being angled downwardly and inwardly relative to said inner wall to form a wedge shape in cross-section and forming the space between the flange and the cap threaded wall in an inverted wedge-shaped cross-section having an open lower end, relative to the cap base, into which the rim may be inserted;

said flange being formed of a semi-rigid, relatively resilient material and of a diameter which snuggly fits into the neck of the container and forcibly presses radially outwardly against the rim when the container neck is threadedly inserted into the space and threadedly connected thereto;

whereby the pressure contact between the flange and the interior surface defining the neck forms a leak-proof seal and simultaneously forces the co-acting threads of the cap and neck tightly together for sealing against leakage and preventing liquid from escaping from the container neck into the areas of the inter-engaged threads so that the cap may be easily removed from the neck when desired;

a tubular spout formed integral with the cap base, coaxial with the hole in the base, and extending downwardly through the cap for extending into the neck of the container for conveying liquid from the container through the spout and opening in the cap base and into the porous pad;

a socket formed on the upper, exposed surface of the cap base within which the porous pad is inserted, with the socket being formed of parallel, elongated sidewalls and end walls, and said pad being shaped as an elongated narrow strip fitted within the socket for applying a band of liquid upon a surface when the applicator is drawn along the edge of the surface;

an edge guide plate integrally formed on one of the end walls of the socket and extending perpendicular thereto to form a guide for engaging along the edge of a panel while the applicator pad traverses the surface of the panel adjacent that edge; and said panel being formed in a flat, approximately rectangular, shape with opposite free edges of the plate formed with widened beads which is outwardly of the panel surface for engaging with a panel edge during use of the applicator for thereby reinforcing the plate and making sliding control with the panel edge during application use while the plate is in guiding contact with the panel.

2. A leak-proof, removable and replaceable applicator tip for a container having a tubular shaped, rimmed threaded neck through which liquid material from the container may flow, with said tip having a cup-shaped applicator cap having a base for covering a neck opening and an internally threaded circular wall for threadedly attaching the cap upon the container neck, and an opening in the cap base covered by a porous pad through which liquid from the container may flow and be applied upon a planar surface, the improvement comprising:

a narrow flange formed as a ring within the cap, integral with the cap base, and spaced inwardly of the cap threaded wall to form an annular space between the threaded cap wall and the flange;

said flange having an inner wall surface and an outer wall surface with the outer wall being angled downwardly and inwardly relative to said inner wall to form a wedge shape in cross-section and forming the space between the flange and the cap threaded wall in an inverted wedge-shaped cross-section having an open lower end, relative to the cap base, into which the rim may be inserted;

said flange being formed of a semi-rigid, relatively resilient material and of a diameter which snuggly fits into the neck of the container and forcibly presses radially outwardly against the rim when the container neck is threadedly inserted into the space and threadedly connected thereto;

whereby the pressure contact between the flange and the interior surface defining the neck forms a leak-proof seal and simultaneously forces the co-acting threads of the cap and neck tightly together for sealing against leakage and preventing liquid from escaping from the container neck into the areas of the inter-engaged threads so that the cap may be easily removed from the neck when desired;

a tubular spout formed integral with the cap base, coaxial with the opening in the base, and extending downwardly through the cap for extending into the neck of the container for conveying liquid from the container through the spout and hole in the cap base and into the porous pad;

a socket formed on the upper, exposed surface of the cap base within which the porous pad is inserted, with the socket being formed of parallel, elongated sidewalls and end walls, and said pad being shaped as an elongated narrow strip fitted within the socket for applying a band of liquid upon a surface when the applicator is drawn along the edge of the surface;

a flat edge guide plate integrally formed with one end wall of the socket and extending perpendicular to said end wall for engaging an slideably engaging the edge of a panel surface when using the applicator to apply a liquid upon the panel; and the plate having free side edges, each formed with continuous and integral beads extending transversely outwardly of the plate surface.

3. A leak-proof, reusable and replaceable applicator tip for threaded attachment upon a rimmed threaded neck of an applicator container for applying liquid material held in the container through the tip upon a surface, comprising:

a cup-shaped cap member having a base for overlapping and covering an opening in a neck of a container, and a sidewall having internally formed threads for engaging and securing the tip upon a neck;

an opening formed in the base through which liquid material may flow from the tip;

a depending continuous flange, integral with the base, formed as a ring arranged parallel to, but spaced radially inwardly of the threaded sidewall of the cup-shaped cap to provide an annular continuous space between the flange and the threaded wall of the cap;

said flange ring being formed at a diameter to closely fit within the neck of a container and having an exterior surface that is sloped inwardly from the cap base to the free edge of the flange so that the flange is generally wedge-shaped, and simultaneously forms the cross-sectional shape of a the annular space into a covering generally wedge shape into which the rim may be inserted for threadedly engaging the thread of the cap;

said flange being sufficiently resilient to press radially outwardly against the interior surface of the neck within the cap for thereby forming a tight, leak-proof seal between the neck and the cap and simultaneously a tight engagement between the co-acting threads of the cap and the neck;

whereby liquid from the container, is prevented from flowing around the rim of a neck into the threaded area of the cap so that the cap may be easily removed, from the container without obstructions caused by contact with the liquid, and may be replaced and reused whenever the container is emptied and replaced by another container;

and including an integral socket formed on the upper, exposed surface of the cap, and a porous, elongated, narrow pad positioned within the socket with the pad overlapping the opening and extending on opposite sides of the hole over the cap base, for receiving and disbursing liquid flowing through the cap, for thereby applying such liquid upon a surface;

and including a guide member formed as a thin narrow, plate integral with an end of the socket and extending generally perpendicularly thereto, for positioning against an edge of a panel with the porous pad arranged upon the surface of the panel so that the applicator may be drawn along the edge of a panel for applying a band of liquid upon the edge portion of the panel.

4. A construction as defined in claim 3 above, and including continuous beads formed integral with opposite edges of the panel forming the guide for reinforcing and rigidifying the guide against bending or breakage while it is guided along the panel edge.

5. A leak-proof, reusable and replaceable applicator tip for threaded attachment upon a threaded neck of an applicator container for applying liquid material held in the container through the tip upon a surface, comprising:

a cup-shaped cap member having a base for overlapping and covering an opening in a neck of a container, and a sidewall having internally formed threads for engaging and securing the tip upon a neck;

an opening formed in the base through which liquid material may flow from the tip;

a depending continuous flange, integral with the base, formed as a ring arranged parallel to, but spaced radially inwardly of the threaded sidewall of the cup-shaped cap to provide an annular continuous space between the flange and the threaded wall of the cap;

said flange ring being formed at a diameter to closely fit within the neck of a container and having an exterior surface that is sloped inwardly from the cap base to the free edge of the flange so that the flange is generally wedge-shaped, and simultaneously forms the cross-sectional shape of the annular space into a converging generally wedge shape into which the rim may be inserted for threadedly engaging the thread of the cap;

said flange being sufficient resilient to press radially outwardly against the interior surface of a container neck when the neck is threaded within the cap for thereby forming a tight, leak-proof seal between the neck and the cap and simultaneously a tight engagement between the co-acting threads of the cap and the neck;

whereby liquid from the container, is prevented from flowing around the rim into the threaded area of the cap so that the cap may be easily removed, from the container without obstructions caused by contact with the liquid, and may be replaced and reused whenever the container is emptied and replaced by another container;

and including a tubular spout integral with the inner surface of the cap and opening into the opening through the cap base, and extending downwardly through the cap for extending into the neck of the container for carrying fluid to and through the hole;

and including a pair of flat areas formed on diametrically opposite sides of the outer surface of the cap.

\* \* \* \* \*